July 8, 1958
H. D. ANDERSON
2,841,964
PORTABLE AIR COOLER
Filed March 23, 1955
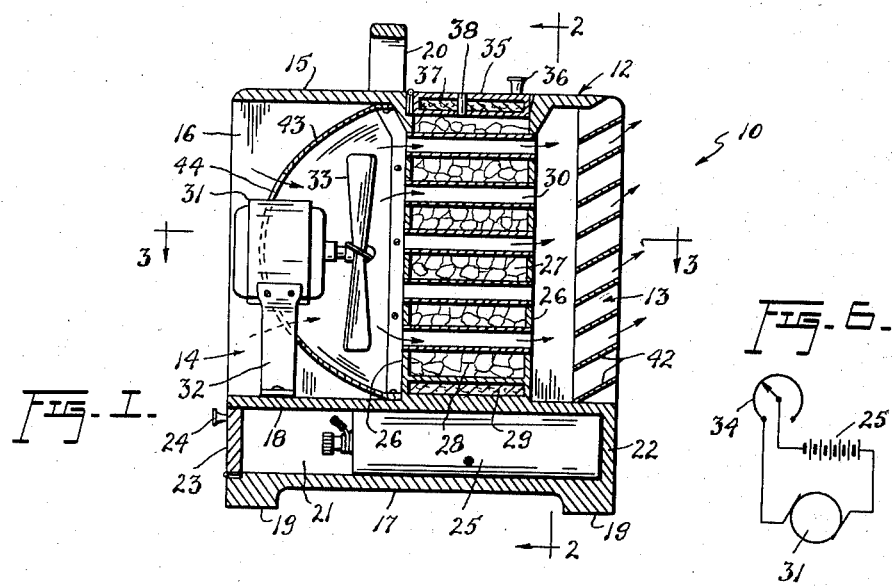
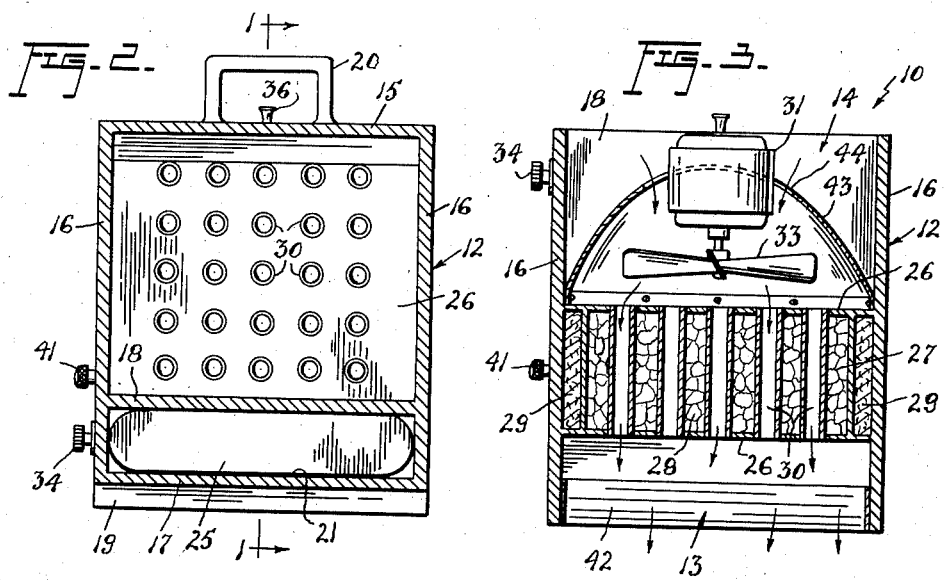
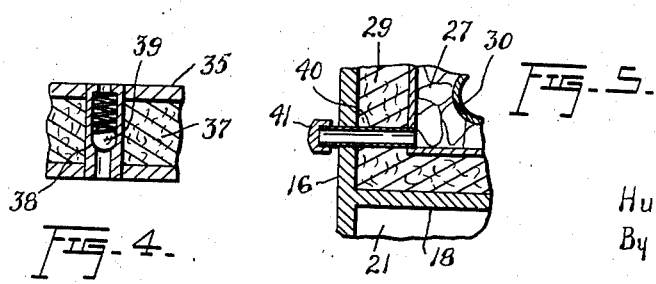
Inventor:
Hubert D. Anderson
By
Atty.

2,841,964
PORTABLE AIR COOLER

Hubert D. Anderson, Coward, S. C.

Application March 23, 1955, Serial No. 496,130

1 Claim. (Cl. 62—426)

This invention relates to new and useful improvements and structural refinements in air coolers, and the principal object of the invention is to provide a fully self-contained, portable cooler which may be conveniently carried for use in baseball stadiums, theatres, auditoriums, automobile races, or any other similar indoor or outdoor locations where personal comfort and relief from heat are desirable.

As such, the invention contemplates the provision of a portable air cooler provided with a compartment to receive crushed ice or Dry Ice, or any other suitable cooling medium, the compartment having air passages therethrough and the device also including an electric fan, powered by a slip-in four cell, six volt, dry battery, for blowing air through such air passages, so that the air discharged from the device is comparatively cool and so that the device, by virtue of its self-contained, portable nature, may be conveniently disposed adjacent the user for blowing a stream of cool air upon him.

Some of the advantages of the invention reside in its simplicity of construction, in its lightness and convenient portability, in its efficient operation, in its durablity, pleasing appearance, and adaptability to economical manufacture.

With the above more important objects and features in view and such other objects and features as may become apparent as this specification proceeds, the invention resides in the arrangement of parts and details of construction, substantially as shown in the accompanying drawing, therein like characters of reference are employed to designate like parts and wherein:

Figure 1 is a vertical sectional view of the invention, taken substantially in the plane of the line 1—1 in Figure 2;

Figure 2 is a vertical sectional view, taken substantially in the plane of the line 2—2 in Figure 1;

Figure 3 is a horizontal sectional view, taken substantially in the plane of the line 3—3 in Figure 1;

Figure 4 is a fragmentary sectional detail, on an enlarged scale, showing the vent used in the invention;

Figure 5 is a fragmentary sectional detail, also on an enlarged scale, showing the drain; and Figure 6 is a wiring diagram of the electrical components used in the invention.

Referring now to the accompanying drawing in detail, the portable, self-contained air cooler is designated generally by the reference numeral 10 and embodies in its construction a substantially rectangular housing 12 having an open front 13 and an open back 14, respectively and including a top wall 15, a pair of side walls 16, a bottom wall 17 and a horizontal partition 18 disposed adjacent the bottom wall, as shown. If desired, the bottom wall 17 may be provided with a plurality of foot rails 19, while the top wall 15 is equipped with a handle 20.

The partition 18 affords a battery compartment 21 in the bottom portion of the housing 12, the front of this compartment being closed by a wall member 22, while a hinged door 23 for the compartment is provided at the back of the housing. The door 23 is equipped with a suitable knob 24, and the compartment 21 receives a suitable electric battery 25 therein, the purpose of which will be hereinafter described. Suitable means (not shown) may be used to prevent the battery from sliding or shifting in the compartment 21, if necessary.

A pair of spaced, transversely extending plates 26 are suitably mounted in the housing 12 and define therebetween a compartment 27 to receive crushed or Dry Ice, or some other cooling medium, shown at 28. If desired, the compartment 27 may have double walls at its sides and bottom to receive suitable insulating material 29, and a set of air passages in the form of open-ended tubes 30 extend through the compartment 27 from the rear to the front thereof, as shown. As will be noted, the compartment 27 is disposed intermediate the front and back of the housing 12.

An electric motor 31, supported by a bracket 32 secured to the partition 18, is provided in the back portion of the housing 12 and has a fan 33 secured to the armature thereof for blowing air through the passages or tubes 30. The motor 31 is powered by the aforementioned battery 25 through the medium of a rheostatic switch 34, so that the speed of the motor may be controlled as desired. The switch 34 is mounted at one side of the housing 12.

The top wall 15 of the housing is provided with a hinged door 35 for the ice compartment 27, the door 35 being equipped with a knob 36 and preferably being double-walled so as to accommodate insulating material 37 therein.

When the compartment 27 is filled with Dry Ice, escape means should be provided for vapor, such as for example, a vent tube 38 equipped with a spring-pressed check valve 39, as is best shown in Figure 4. The tube 38 may be located anywhere in the upper portion of the compartment 27 and, if desired, may extend through the door 35. When the compartment 27 is filled with crushed ice, drain means should be provided for moisture, such as for example, a drain tube 40 extending from the bottom portion of the compartment 27 through one of the side walls 16 of the housing, as shown in Figure 5. The drain tube is equipped with a closure cap 41.

Since the apparatus will be commonly used in locations where it is placed on the ground or floor, a plurality of upwardly angulated air deflecting louvers 42 are mounted in the front portion of the housing 12 to direct the cool air upwardly toward the user. Also, a substantially semi-spherical fan shroud 43 may be provided in the back portion of the housing in surrounding relation to the fan 33 and motor 31, the shroud 43 being formed with a relatively large, centrally disposed air inlet opening 44 which also serves to provide clearance for the motor 31 and bracket 32.

When the invention is placed in use, the compartment 27 is simply filled with crushed or Dry Ice and the fan 33 is energized by means of the switch 34, so that air, drawn through the opening 44 is blown by the fan through the air tubes 30, cooled by the ice in the compartment 27, and discharged through the louver 42 toward the user.

The capacity of the ice compartment 27, together with the provision of the insulation 29, 37 permits the apparatus to be used for considerable periods of time without the need for replenishing the ice supply. Similarly, the battery 25, which is preferably of the usual, multi-cell variety, has a sufficient life span to operate the motor 31 for extended periods of time without need for battery replacement.

While in the foregoing there has been shown and described the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claim.

What is claimed as new is:

A self-contained portable air cooler, comprising in combination a substantially rectangular housing having an open front and back and including top and bottom walls and a pair of side walls, a horizontal partition provided in said housing adjacent the bottom wall thereof and affording a battery compartment in the bottom portion of the housing, a front wall member provided for said battery compartment at the front of the housing, a hinged door provided for the battery compartment at the back of the housing, a pair of spaced vertical plates extending from said partition to the top wall of the housing and defining an ice compartment therebetween, said plates extending transversely between said side walls and being spaced inwardly from the respective front and back of the housing, a set of open-ended tubes mounted in said plates and extending through said ice compartment, a hinged door for the ice compartment provided in the top wall of the housing, a plurality of upwardly angulated air deflecting louvers provided in the open front portion of the housing, a substantially semi-spherical shroud disposed in the open back portion of the housing and formed with a centrally located air inlet opening, a bracket provided on said partition, an electric motor carried by said bracket substantially in alignment with said opening, a fan secured to the armature of said motor and disposed within said shroud, a dry cell battery positioned in said battery compartment and operatively connected to said motor, and a switch mounted at one side wall of said housing in circuit with said battery and said motor.

References Cited in the file of this patent

UNITED STATES PATENTS

| | | |
|---|---|---|
| 774,811 | Witter | Nov. 15, 1904 |
| 904,420 | Grayson | Nov. 17, 1908 |
| 1,932,696 | Heydthausen | Oct. 31, 1933 |
| 1,966,011 | Hubbell | July 10, 1934 |
| 2,119,338 | Mills | May 31, 1938 |
| 2,162,538 | Peo | June 13, 1939 |
| 2,196,310 | Kalin | Apr. 9, 1940 |
| 2,205,413 | Kaufman | June 25, 1940 |